(12) United States Patent
Gvelesiani

(10) Patent No.: US 8,355,972 B2
(45) Date of Patent: Jan. 15, 2013

(54) SYSTEMS AND METHODS FOR DISPLAYING INFORMATION ABOUT FINANCIAL MARKETS

(75) Inventor: Aleksandr L. Gvelesiani, Seattle, WA (US)

(73) Assignee: IntellectSpace Corporation, Seattle, WA (US)

( * ) Notice: Subject to any disclaimer, the term of this patent is extended or adjusted under 35 U.S.C. 154(b) by 1109 days.

(21) Appl. No.: 11/736,512

(22) Filed: Apr. 17, 2007

(65) Prior Publication Data

US 2008/0262976 A1 Oct. 23, 2008

(51) Int. Cl.
*G06Q 40/00* (2006.01)

(52) U.S. Cl. ......... 705/36 R; 705/35

(58) Field of Classification Search ....... 705/35–45
See application file for complete search history.

(56) References Cited

U.S. PATENT DOCUMENTS

| | | |
|---|---|---|
| 5,414,809 A | 5/1995 | Hogan et al. |
| 5,819,270 A | 10/1998 | Malone et al. |
| 6,035,300 A | 3/2000 | Cason et al. |
| 6,237,006 B1 | 5/2001 | Weinberg et al. |
| 6,823,495 B1 | 11/2004 | Vedula et al. |
| 7,167,910 B2 | 1/2007 | Farnham et al. |
| 7,265,755 B2 | 9/2007 | Peterson |
| 7,380,217 B2 | 5/2008 | Gvelesiani |
| 7,908,204 B2 * | 3/2011 | Boglaev ............... 705/37 |
| 2002/0069152 A1 * | 6/2002 | B.C et al. ............. 705/37 |
| 2003/0065527 A1 | 4/2003 | Yeh et al. |
| 2003/0097325 A1 * | 5/2003 | Friesen et al. ........ 705/37 |
| 2003/0172049 A1 | 9/2003 | Choy et al. |
| 2004/0107125 A1 | 6/2004 | Guheen et al. |
| 2005/0004813 A1 | 1/2005 | Gvelesiani |
| 2006/0095563 A1 | 5/2006 | Benjamin et al. |
| 2007/0179856 A1 | 8/2007 | O'Kelley |

FOREIGN PATENT DOCUMENTS
WO 9927495 6/1999

OTHER PUBLICATIONS http://web.archive.org/web//http://finance.yahoo.com/q?s=ge archived at Wayback Machine dated Feb. 6, 2005.*
Eick, "Visualizing Online Activity," Communications of the ACM, Aug. 2001, vol. 44, No. 8, pp. 45-50.
Friedgan, "Graphical Patterns for Data Models," The Data Administration Newsletter (TDAN.com), Oct. 6, 2001, URL=http://www.tdan.com/i022ht01.htm, 6 pages.

(Continued)

*Primary Examiner* — Rajesh Khattar
(74) *Attorney, Agent, or Firm* — Lowe Graham Jones PLLC

(57) ABSTRACT

Enhanced methods, systems, and techniques for displaying information about financial markets are provided. Example embodiments provide a Market Performance Indicator System ("MPIS"), which generates and provides indicators of market performance, based on obtained market information. In some embodiments, a performance indicator may include a directional indicator, such as an arrow or vector, indicating the value and/or change in value of one or more attributes of performance of an aspect of a financial market. Aspects of a financial market may include individual financial instruments, such as stocks and bonds, as well as aggregate information about a particular market, such as a market index. Attributes of performance may include price, volume of trading, and price variability. This abstract is provided to comply with rules requiring an abstract, and it is submitted with the intention that it will not be used to interpret or limit the scope or meaning of the claims.

29 Claims, 7 Drawing Sheets

OTHER PUBLICATIONS

Guo et al., "A web application using RDF/RDFs for metadata navigation," Proceedings of the 4th Workshop on NLP and XML (NLPXML-2004), Jul. 25, 2004, URL=http://www.acl.ldc.upenu-edu/acl2004/nlpxml/pdf/guo-etal.pdf, 8 pages.

Merriam-Webster, Definition of Difference, http://www.merriam-webster.com/dictionary/permanent, Nov. 2, 2010, 2 pages.

Merriam-Webster, Definition of Permanent http://www.merriam-webster.com/dictionary/difference, Nov. 2, 2010, 2 pages.

Merriam-Webster, Definition of Remainder http://www.merriam-webster.com/dictionary/remainder, Nov. 2, 2010, 2 pages.

Microsoft Press, Computer Dictionary, Third Edition, Published by Microsoft Press, A Division of Microsoft Corporation, One Microsoft Way, Redmond, Washington 98052-6399, Copyright 1997 by Microsoft Corporation, 3 pages.

* cited by examiner

200

201 — Stock A

202 — Stock B

203 — Stock C

210

211 ~ Stock A 215 ↗ 214 ⇢

212 ~ Stock B

213 ~ Stock C

SYSTEMS AND METHODS FOR DISPLAYING INFORMATION ABOUT FINANCIAL MARKETS

TECHNICAL FIELD

The present disclosure relates to methods and systems for displaying information about financial markets and, in particular, to methods and systems for efficiently representing information about the performance of financial instruments being traded on financial markets.

BACKGROUND

A number of approaches exist for providing participants in financial markets with information about the behavior of such markets. In some cases, a simple textual display of the price or other characteristic (e.g., trading volume) of one or more instruments (e.g., stocks, bonds, etc.) being traded on a financial market may be presented. For example, a "stock ticker" may provide a market participant with real time, or near real time, information about the prices of each of multiple stocks. The stock ticker may serially display stock symbols and associated prices on some medium of expression, such as a paper tape, a television screen, or a computer terminal. One drawback with such an approach is that a market participant may have to wait to obtain information about a particular instrument of interest as the ticker cycles through a potentially large number of other instruments (e.g., all stocks on the Standard and Poor's 500 Index). Accordingly, access to specific information may be particularly inefficient.

In other cases, information about financial instruments may be represented in tabular form, with various financial instruments arranged in some ordering (e.g., alphabetically by stock symbol, etc.), so that market information may be efficiently indexed, searched, or otherwise obtained by a market participant. Such an approach may however also suffer from various drawbacks. For example, such tables of information about financial instruments in at least some cases do not reflect real time information about the behavior of a market, as they may be compiled over relatively large time intervals (e.g., at the end of every trading day). In addition, such a table may present a particular market participant with far more information than they desire, since the table may include many stocks not of interest to the market participant (e.g., when the table includes information about every stock being traded on an exchange).

Other techniques for providing market information include graphical views, such as a two dimensional graph of the price of a particular financial instrument over time. Such graphs typically include plots of raw prices for a particular financial instrument observed at various points in time. Such plots may not aggregate and efficiently display information about trends, tendencies, or other patterns of behavior that may influence a market participant's decision to trade (e.g., buy or sell) a particular instrument. In addition, such graphs typically cannot simultaneously provide a viewer with information regarding trends over multiple different time periods, such as long-term (e.g., year scale) and short-term (e.g., day or week scale) trends.

DETAILED DESCRIPTION

Figure 1:
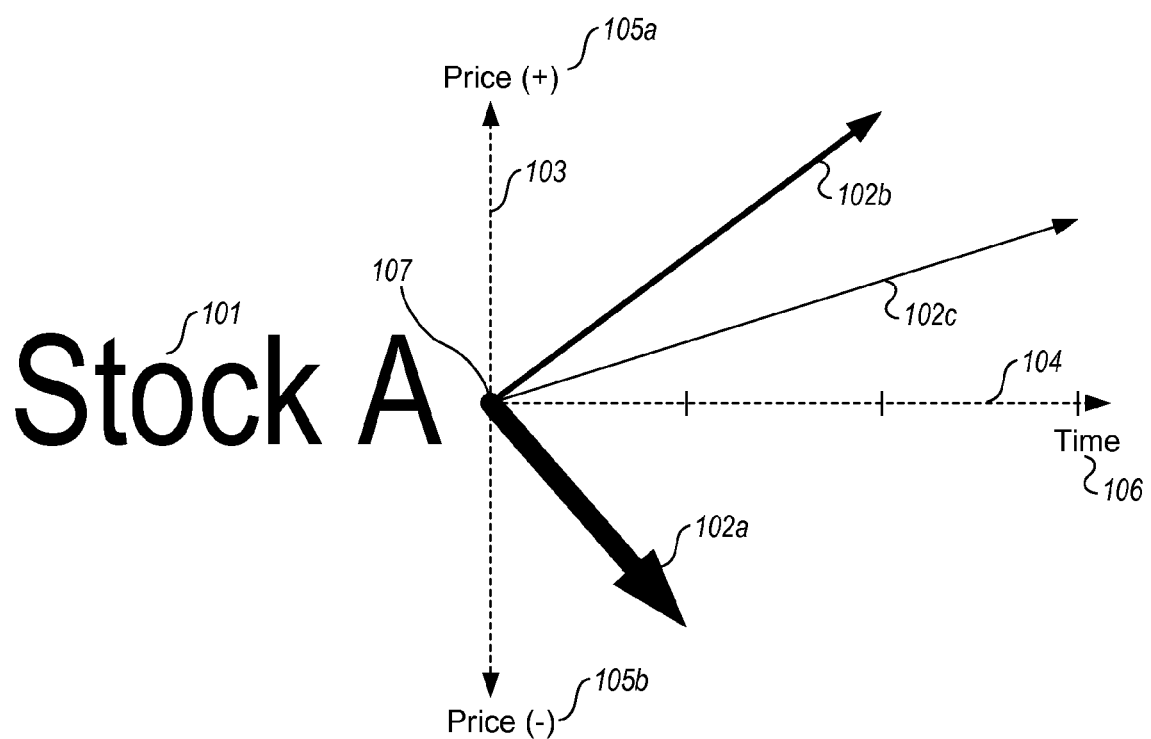
FIG. 1 is an example display of multiple indicators of performance of a financial instrument.

Embodiments described herein provide enhanced computer-based techniques for displaying information about financial markets. In some embodiments, the techniques include providing users with indicators of the performance of various instruments being traded on financial markets, as well as other information about financial markets generally. In some embodiments, an indicator of performance of a financial instrument may include a directional indicator (e.g., an arrow, a vector, etc.) that indicates the change in a particular attribute of the performance (e.g., price, volume of trading, etc.) of the financial instrument over time. In addition, such an arrow may further indicate other attributes of performance, such as by use of color (e.g., by associating particular colors with various degrees or levels of change of a particular attribute of performance) and/or line thickness (e.g., by having thicker lines represent higher levels of change of a particular attribute of performance). In at least some embodiments, at least some of the described techniques are performed by a Market Performance Indicator System ("MPIS"), in order to provide users with indicators of the performance of various instruments being traded on financial markets, such as by initiating the display of one or more indicators of performance on a client system, such as a Web browser.

The described techniques may be utilized to efficiently and compactly display or otherwise represent various kinds of quantitative information about financial markets. In some embodiments, attributes of performance of various aspects of financial and other markets may be displayed. Market aspects may include individual items of value such as financial instruments (e.g., stocks, bonds, index funds, mutual funds, commodities, currency, commercial paper, etc.), as well as aggregate information about financial markets, such as average prices of predetermined baskets, collections, groups, or indexes of stocks (e.g., Dow Jones Industrial Average, Standard and Poor's 500 Index, exchange traded funds, etc.).

The techniques described herein can be employed in many other contexts. Other example applications include, but are not limited to, providing information about personal finances (e.g., cash flows and/or balances of various checking, savings, and/or retirement accounts), environmental conditions (e.g., weather conditions, traffic conditions, snowfall amounts for ski areas), public opinion, conditions observed within the context of information systems (e.g., network traffic, CPU utilization, input output performance, etc.), other market conditions such as those in a real estate market, consumer goods market (e.g., prices for consumer electronics), online auctions (e.g., prices of new or used goods based on paid prices at auction), etc.

Although example embodiments described below and in the figures are generally discussed in terms of providing information about financial instruments, the described techniques are not limited to such an application. For example, where examples are presented in terms of one or more "financial instruments," such instruments are intended to include individualized instruments (e.g., shares of a particular stock) as well as real and/or synthetic aggregate indications of market conditions (e.g., indexes, mutual funds, exchange traded funds).

FIG. 1 is an example display of multiple indicators of performance of a financial instrument. The example display includes an identification of a financial instrument 101 ("Stock A"), as well as three indicators of performance of the financial instrument, arrows 102a-102c. Also shown is an origin 107, a y-axis 103, an x-axis 104, a first y-axis label 105a ("Price (+)"), a second y-axis label 105b ("Price (-)"), and an x-axis label 106 ("Time"). In many embodiments, the axes 103-104 and the labels 105a, 105b, and 106 would not be displayed, but are illustrated here for explanatory purposes. Each of the arrows 102a-102c indicates the change of a single attribute (in this case, price) of the performance of Stock A over various time intervals. In the illustrated example, arrow 102a indicates the change in the price of Stock A over the last day, arrow 102b indicates the change in the price of Stock A over the last two days, and arrow 102c indicates the change in the price of Stock A over the last three days. In particular, the illustrated example shows that the price of Stock A has fallen sharply over the last day, but increased when measured over the last two or three days.

Changes in performance attributes such as price and/or other displayed information may be represented in various ways or at various scales. For example, price may be measured and/or represented in absolute (e.g., price measured as units of currency per share) or normalized terms (e.g., percentage change in price). In addition, various scales used to present performance information may be employed. For example, in the illustrated example, time and price are displayed on a linear scale, such that if a first arrow has a y-axis component (e.g., price change) that is twice as large as that of a second arrow, this may be taken to represent a change in the value of the attribute represented by the first arrow that is twice that represented by the second arrow. Alternative scales, such as log-based may be used. For example, time may be represented on a log scale, so as to compress time with distance from the origin 107. By representing time on a log-scale, the three illustrated arrows 102a-102c may, for example, represent change in price over the last day, week, and month, respectively.

The illustrated arrows 102a-102c each may be used to represent additional information about the performance of Stock A, such as by their color, shade, or thickness. For example, color may be utilized to represent changes or behaviors of some other attribute of performance, such as variability in a particular attribute (e.g., price) over a particular time interval. For example, a color spectrum (e.g., red, orange, yellow, green, and blue) may be utilized to indicate higher or lower levels or degrees of price variability. In particular, a given spectrum of colors consisting of red, orange, yellow, green, and blue, may indicate respectively decreasing levels of price variability, with red reflecting the highest level and blue reflecting the lowest level. In the illustrated example, coloring arrows 102a-102c red, blue, and green, respectively, would reflect that Stock A has very high price variability over the last day, very low price variability over the last two days, and moderate price variability over the last three days. In other embodiments, shades of gray (e.g., darker shades used to indicate higher levels) or other visual techniques may be employed.

In addition, the illustrated arrows 102a-102c each have an associated line thickness that may be utilized to represent the behavior of some other attribute of performance. For example, arrow line thickness may be utilized to represent volume of trading of the identified financial instrument, such that a thicker line reflects a higher level of trading volume. In the illustrated example, arrow 102a is thicker than arrow 102b, which in turn is thicker than arrow 102c, reflecting that the trading volume of Stock A was higher-than-normal over the last day, normal over the last two days, and lower-than-normal over the last three days.

FIGS. 2A-2D are example displays of various indicators of performance of financial instruments as provided by various example embodiments.

Figure 2A:
FIGS. 2A-2D are example displays of various indicators of performance of financial instruments as provided by various example embodiments.
Figure 2A:
Figure 2A:

FIG. 2A is an example display screen showing the relative performance of three stocks. In particular, FIG. 2A illustrates a display 200 of three stocks 201-203, labeled as Stock A, Stock B, and Stock C, respectively. Each stock is associated with a corresponding performance indicator 204-206. In the illustrated example, each indicator 204-206 is an arrow that shows the performance of its corresponding stock over the last day. The indicators 204-206 may be viewed by a user to discern, for example, that Stocks A and B increased in price, while Stock C decreased in price over the last day. In addition, each indicator 204-206 has a thickness that represents trading volume over the illustrated time period. Trading volume may be represented in absolute or relative terms (e.g., relative to other displayed stocks). Accordingly, a user may discern, based on the line thickness of the indicators 204-206, that Stock C traded at the highest volume, Stock A traded at the second-highest volume, and Stock B traded at the lowest volume, of the three displayed stocks.

Figure 2B:
Figure 2B:

FIG. 2B is an example display screen showing the relative performance of three stocks over multiple overlapping time intervals. In particular, FIG. 2B illustrates a display 210 of three stocks 211-213, labeled as Stock A, Stock B, and Stock C, respectively. Each stock is associated with corresponding performance indicators, such as indicators 214 and 215, associated with Stock A. In the illustrated example, two indicators (e.g., arrows) are used to provide a user with information regarding the performance of an associated stock over two different, overlapping time periods. For example, the longer indicator 214 may indicate the performance of Stock A over the last week, while the shorter indicator 215 may indicate the performance of Stock B over the last day. In addition, as described in more detail above, the illustrated indicators have an associated thickness, that may be used to represent performance of another attribute (e.g., trading volume) of the associated financial instrument. Furthermore, the illustrated indicators may be textured (e.g., solid, dotted, dashed), such that line texture may be used to represent an additional attribute of performance of the associated financial instrument. In the illustrated example, texture is used to illustrate price variability, with dashed lines indicating more variability than solid lines.

Figure 2C:
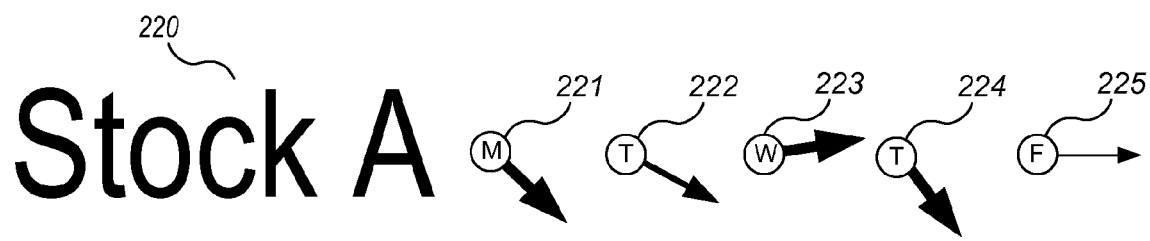

FIG. 2C is an example display screen showing performance of a single stock over multiple distinct time intervals. In particular, FIG. 2C depicts a stock 220, labeled Stock A, associated with five corresponding performance indicators 221-225. The performance indicators 221-225 provide a time series view of the performance of Stock A over a number of consecutive, uniformly sized time periods (e.g., hours, days, weeks, months, years, etc.). In particular, indicators 221-225 respectively illustrate the change in price of Stock A on Monday, Tuesday, Wednesday, Thursday, and Friday of a specified week. The illustrated performance indicators 221-225 are also labeled to indicate the day of week they represent (e.g., with "M" for Monday, "T" for Tuesday, etc.). In addition, as described in more detail above, the illustrated indicators have an associated thickness that may be used to represent performance of another attribute (e.g., trading volume) of the associated financial instrument.

In the illustrated embodiment, the length of each performance indicator 221-225 is used to represent a time period associated with the performance indicator. In particular, the performance indicators 221-225 are all equal (or substantially equal) in length, so as to indicate that each indicator reflects the performance of Stock A over a uniformly sized time period (e.g., one day). In the illustrated embodiment, the angle and/or slope of each performance indicator may correspondingly vary as a function (e.g., linear, quadratic, etc.) of the change in the price or other attribute of the corresponding instrument. For example, a first indicator having an angle (e.g., measured from horizontal) that is twice that of a second indicator may indicate that the change in price reflected by the first indicator is twice that of the change in price reflected by the second indicator. As described above, in other embodiments, a time period associated with each performance indicator 221-225 may instead be represented via the horizontal component (e.g., x-axis component) of the performance indicator. In such embodiments, the illustrated performance indicators 221-225 may have differing lengths, depending on their respective slopes, such that performance indicators having steeper slopes would typically also have longer lengths. Other embodiments having differing line lengths representative of other information (e.g., trading volume, price variability, etc.) are also possible.

Figure 2D:
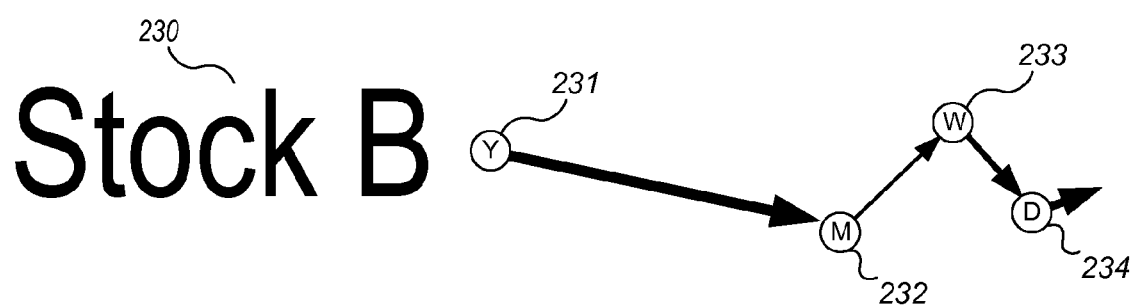

FIG. 2D is an example display screen showing performance of a single stock over multiple time intervals. In particular, FIG. 2D depicts a stock 230, labeled Stock B, associated with four corresponding performance indicators 231-234. The performance indicators 231-234 provide a time series view of the performance of Stock B over a number of consecutive time intervals. In particular, indicators 231-234 respectively illustrate the change in price of Stock A over the last year, the last month, the last week, and the last day. The differing lengths of the indicators 231-234 represents that the illustrated time intervals are not uniform in size. In the illustrated embodiment, the time intervals are consecutive, not uniformly sized, and overlap one another (e.g., indicator 231 represents performance over the entire last year, while indicator 234 represents performance over the last day of the last year). However, other combinations are contemplated, such as time intervals that are non-consecutive, uniform, and non-overlapping (e.g., displaying performance for the month of January for each of the last five years), time intervals that are consecutive, non-uniform, and overlapping, etc. The illustrated performance indicators 231-234 are also labeled to indicate the time period they represent (e.g., with "Y" for last year, "M" for last month, etc.). In addition, as described in more detail above, the illustrated indicators have an associated thickness that may be used to represent performance of another attribute (e.g., trading volume) of the associated financial instrument.

In at least some embodiments, the example displays of FIGS. 1 and 2A-2D may be presented in such a way that they provide direct manipulation capabilities to a viewing user. For example, a user may interact with a performance indicator by selecting, dragging, moving, resizing, or otherwise manipulating it. Various action semantics may be associated with such manipulations. For example, selecting (e.g., via a mouse click or double-click) an arrow may provide a user with a message box showing the source (e.g., the particular market on which the instrument is traded) and the raw data used to determine the indicator. Hovering over (e.g., by placing a mouse pointer) the beginning or end of an arrow may provide a user with a message box showing the actual starting or ending price or other attribute value of the financial instrument. Dragging an indicator may move or resize the indicator, possibly in coordination with other indicators (e.g., with other indicators being simultaneously resized by the same amount).

In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular routine.

Figure 3:
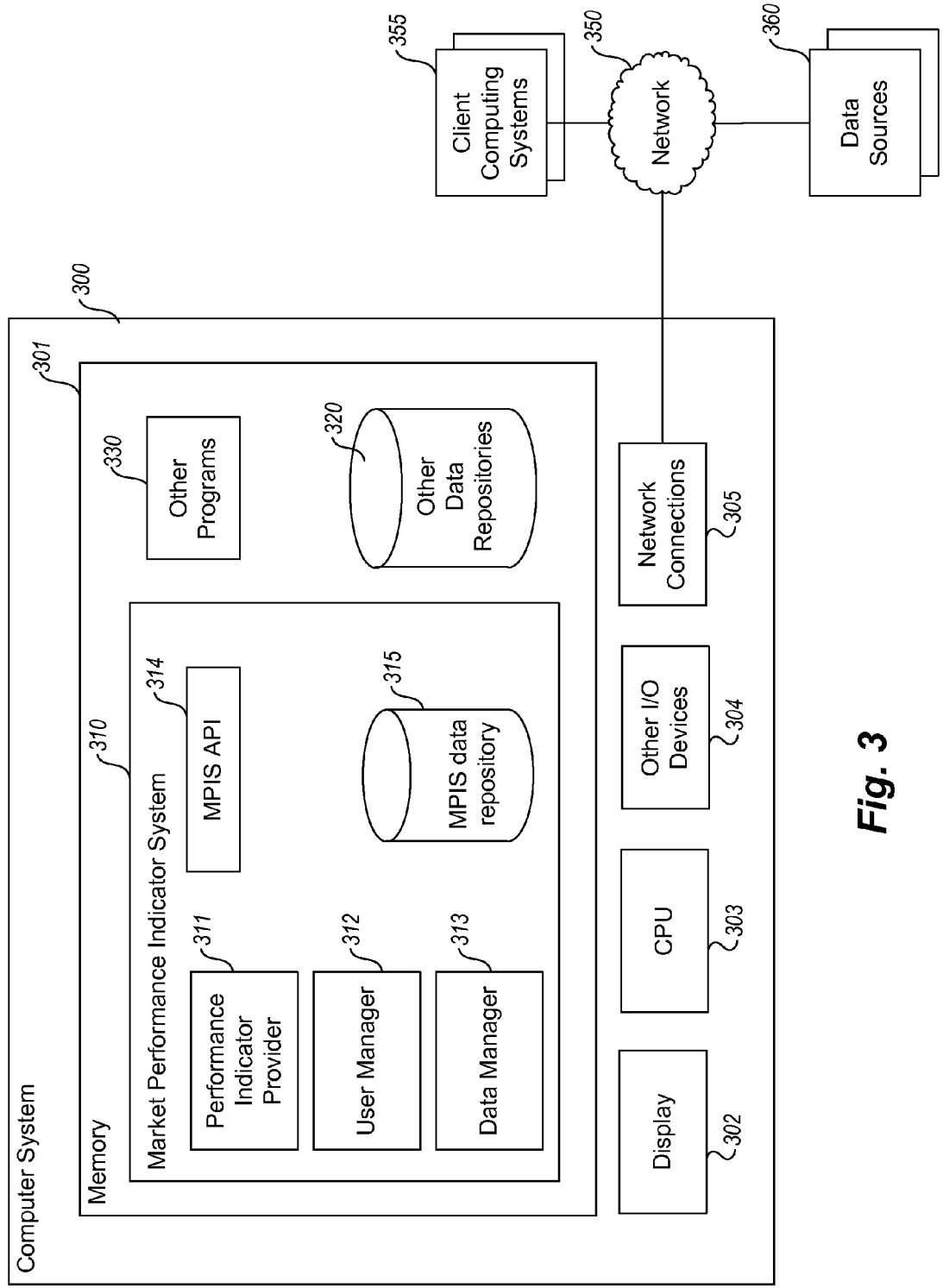
FIG. 3 is an example block diagram of a general purpose computer system for practicing embodiments of a Market Performance Indicator System.

FIG. 3 is an example block diagram of a general purpose computer system for practicing embodiments of a Market Performance Indicator System. The general purpose computer system 300 may comprise one or more server and/or client computing systems and may span distributed locations. In addition, each block shown may represent one or more such blocks as appropriate to a specific embodiment or may be combined with other blocks. Moreover, the various blocks of the Market Performance Indicator System 310 may physically reside on one or more machines, which use standard (e.g., TCP/IP) or proprietary interprocess communication mechanisms to communicate with each other.

In the embodiment shown, computer system 300 comprises a computer memory ("memory") 301, a display 302, a Central Processing Unit ("CPU") 303, Input/Output devices 304 (e.g., keyboard, mouse, CRT or LCD display, etc.), and network connections 305. The Market Performance Indicator System ("MPIS") 310 is shown residing in memory 301. The modules of the MPIS 310 preferably execute on CPU 303 and manage the generation of performance indicators, and the provision of those performance indicators to various users of the MPIS 310, as described in previous figures. Other programs 330 and potentially other data repositories, such as data repository 320, also reside in the memory 310, and preferably execute on one or more CPU's 303. In a typical embodiment, the MPIS 310 includes a performance indicator provider module 311, a user manager module 312, a data manager module 313, a MPIS application program interface ("API") 314, and an MPIS data repository 315.

In the illustrated embodiment, the MPIS 310 provides indicators of market performance to users operating client computing systems 355 via network 350. In some embodiments, the illustrated MPIS 310 may interact with users via a Web server (not shown) operating as one of the other programs 330, so as to provide a Web-based platform for providing market information. In addition, the MPIS 310 may obtain information about financial markets from one or more data sources 360. Such data sources may include market information providers that provide information about market conditions in real time, or near real time. As the MPIS 310 obtains market information, it may be stored in the MPIS data repository 315, for further processing, such as by the performance indicator provider module 311.

The performance indicator provider module 311 generates indicators of performance for one or more financial instruments based on market information, such as may be stored in the MPIS data repository 315 and/or otherwise received from data sources 360. In addition, the performance indicator provider module 311 provides such indicators to users operating client computing systems 355, such as by initiating display of such indicators on a Web browser or other client application (not shown) executing on one or more of the client computing systems 355.

The user manager module 312 may interact with users operating the client computing systems 355, so as to provide functionality with which users may specify or otherwise manage user preferences that are stored in the MPIS data repository 315. A particular user may use the user manager module 312 in order to specify preferences for customizing the information provided by the performance indicator provider module 315. For example, such preferences may include one or more collections of financial instruments (e.g., portfolios) that a user wishes to have displayed together, and various performance attributes (e.g., price, volume, price variability, etc.) and display criteria (e.g., color schemes, display scales, legends, etc.) that are to be used when generating and displaying performance indicators.

The data manager module 313 obtains information about financial markets from one or more data sources 360. Such data sources may include market information providers that provide information about market conditions in real time, or near real time. As the data manager module 313 obtains market information, it may be stored in the MPIS data repository 315.

The MPIS API 314 provides programmatic access to various features of the MPIS 310. For example, the MPIS API 314 may provide a programmatic interface by which a data source 360 may push or otherwise send market information to be stored in the MPIS data repository 315 for further processing. The API 314 may also provide programmatic interface to a client application utilized by a user to obtain market information from the MPIS 310. For example, the functionality exposed via the API 314 may support the development of custom applications operating on portable client devices (e.g., smart phones, PDAs, pagers, etc.), custom hardware (e.g., kiosk-based systems), etc.

In an example embodiment, modules of the MPIS 310 are implemented using standard programming techniques. One skilled in the art will recognize that the implementation described above uses well-known or proprietary asynchronous client-server computing techniques. However, any of the MPIS modules 311-315 may be implemented using more monolithic programming techniques as well. In addition, programming interfaces to the data stored (e.g., in the MPIS data repository 315) as part of the MPIS 310 can be available through standard means such as through C, C++, C#, and Java and through scripting languages such as XML, or through web servers supporting such. The MPIS data repository 315 is preferably implemented for scalability reasons as a database system rather than as one or more text files, however any method for storing such information may be used. In addition, many of the modules may be implemented as stored procedures operating in the context of a data repository (e.g., a database management system), or methods attached to financial instrument "objects," although other techniques are equally effective.

The MPIS 310 may be implemented in a distributed environment comprising multiple, even heterogeneous, computer systems and networks. For example, in one embodiment, performance indicator provider module 311, the user manager module 312, the data manager module 313, and the MPIS API 314 are all located in physically different computer systems. In another embodiment, various modules of the MPIS 310 are hosted each on a separate server machine and may be remotely located from the tables which are stored in the data repository 315. Different configurations and locations of programs and data are contemplated for use with techniques described herein. In example embodiments, these modules may execute concurrently and asynchronously; thus the modules may communicate using well-known or proprietary message passing techniques. Equivalent synchronous embodiments are also supported by an MPIS implementation. Also, other functionality could be provided by each module, or existing functionality could be distributed amongst modules in different ways, yet still achieve the functions of the MPIS.

Figure 4:
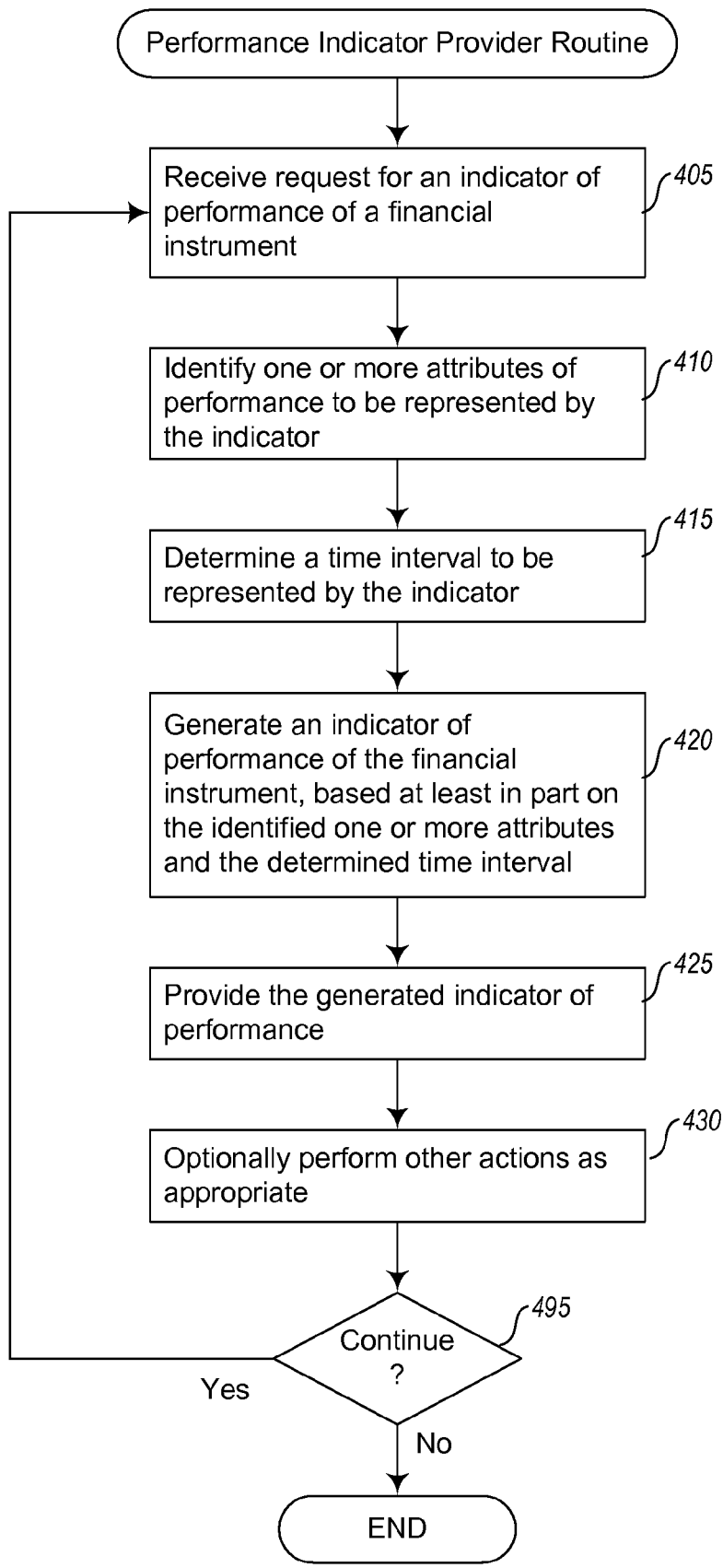
FIG. 4 is an example flow diagram of a Performance Indicator Provider routine provided by an example embodiment of a Market Performance Indicator System.

FIG. 4 is an example flow diagram of a performance indicator provider routine provided by an example embodiment of a Market Performance Indicator System. The illustrated routine may be provided by, for example, execution of the performance indicator provider module 311 of the MPIS 310, described with reference to FIG. 3. The illustrated routine generates and provides indicators of performance of financial instruments in response to received requests. Such requests may be received from, for example, users operating client computing systems 355, as described with reference to FIG. 3, for purposes of display on a client application.

In steps 405-495, the routine performs a loop in which it repeatedly receives a request for an indicator of performance of a financial instrument, generates an indicator based on observations about the performance of the financial instrument, and provides the generated indicator. Specifically, the routine begins in step 405 where it receives a request for an indicator of performance of a financial instrument. The request may be received from various sources, such as from an interactive client application (e.g., a Web browser) being operated by a user, a market information display system (e.g., a kiosk that periodically automatically updates indicators of market information), etc. The financial instrument may be identified in various ways, such as by an identifier (e.g., stock symbol, identification number, etc.) included in the received request.

In step 410, the routine identifies one or more attributes of performance to be represented by the indicator. Such attributes may include various quantitative aspects of the performance of the financial instrument, such as price, trading volume (e.g., number of shares exchanged per unit time), market capitalization, or variability and/or rates of change of any such aspects (e.g., intraday price variability and/or rate of price change, expressed in units of currency per unit time). In some cases, the attributes of performance may be provided to the routine along with the request received in step 405, such that they may be identified by parsing or otherwise inspecting the received request. In other cases, the attributes of performance may have been previously specified by a particular user, such that they may be identified by retrieval from a data repository, such as MPIS data repository 315, described with reference to FIG. 3. In still other situations, the attributes of performance may be default attributes that are utilized by the routine, in the absence of, or in conjunction with, attributes provided in other manners as described above.

In step 415, the routine determines a time interval having a first time and a second time. The time interval may also be determined in various ways, such as by reference to user preferences (e.g., that a given user prefers to view performance indicators for the last day, week, etc.), specifications provided as part of the received requests, and/or default settings used by the routine.

In step 420, the routine generates an indicator of performance of the financial instrument, based at least in part on the identified one or more attributes and the determined time interval. For example, the received request may have specified a request for an indicator of performance that represents the change in the price of Stock XYZ over the last 24 hours along with an indication of its trading volume during that time period. In response, the routine in step 420 may generate an indicator of the performance of the price of Stock XYZ that is a line having two endpoints (an origin and a destination) and a thickness, such that horizontal component (e.g., x-axis component) of the line reflects the time interval over which the price of Stock XYZ is being represented (e.g., 24 hours), the vertical component (e.g., y-axis component) of the line reflects the change in price of Stock XYZ over the time interval, and the thickness of the line reflects the volume of trading over the time interval. As described in more detail above, various attributes of performance may be represented in various other manners (e.g., line thickness, shade, color, etc.).

In step 425, the routine provides the generated indicator of performance of the financial instrument. In some cases, this may include initiating display of the generated indicator by providing a description of the generated performance indicator, such as dimensions and other characteristics (e.g., thickness, color, etc.), such that a remote client application may display the generated performance indicator (e.g., by displaying an arrow having the provided dimensions, color, etc.).

In step 430, the routine optionally performs other actions as appropriate. In some embodiments, the routine may cache generated indicators of performance of various financial instruments, so as to more efficiently process future requests for previously computed information. This step may also include operations such as performing administrative tasks (e.g., logging requests for auditing purposes), initiating billing operations (e.g., charging users for the provided information), etc.

In step 495, the routine determines whether to continue, and, if so continues to step 405 to await further requests, else ends. The routine may determine not to continue under various circumstances, such as by receiving a shutdown instruction (e.g., a request, signal, etc.).

In addition, the techniques described herein may be particularly beneficial in the context of systems and methods for graphically displaying business knowledge, such as information about relationships between businesses entities and/or individuals. Such systems may provide graphical and other (e.g., textual) representations of relationships with business significance between multiple business-related entities (e.g., individuals, partnerships, clubs, governmental bodies, corporations, non-profit organizations, etc.). In some embodiments, a provided display of relationships between business entities may be augmented with indicators of performance of financial instruments associated with those business entities, so as to assist a user in better understanding the impact of the represented relationships, or for other purposes. Various additional details related to example techniques for graphically displaying information about relationships between businesses entities are included in U.S. Patent Publication No. 2005/0004813, published on Jan. 6, 2005 and entitled "Method of Graphical Representation of Relationships Between Individuals, Business Entities, and Organizations," which is incorporated herein by reference in its entirety.

Figure 5:
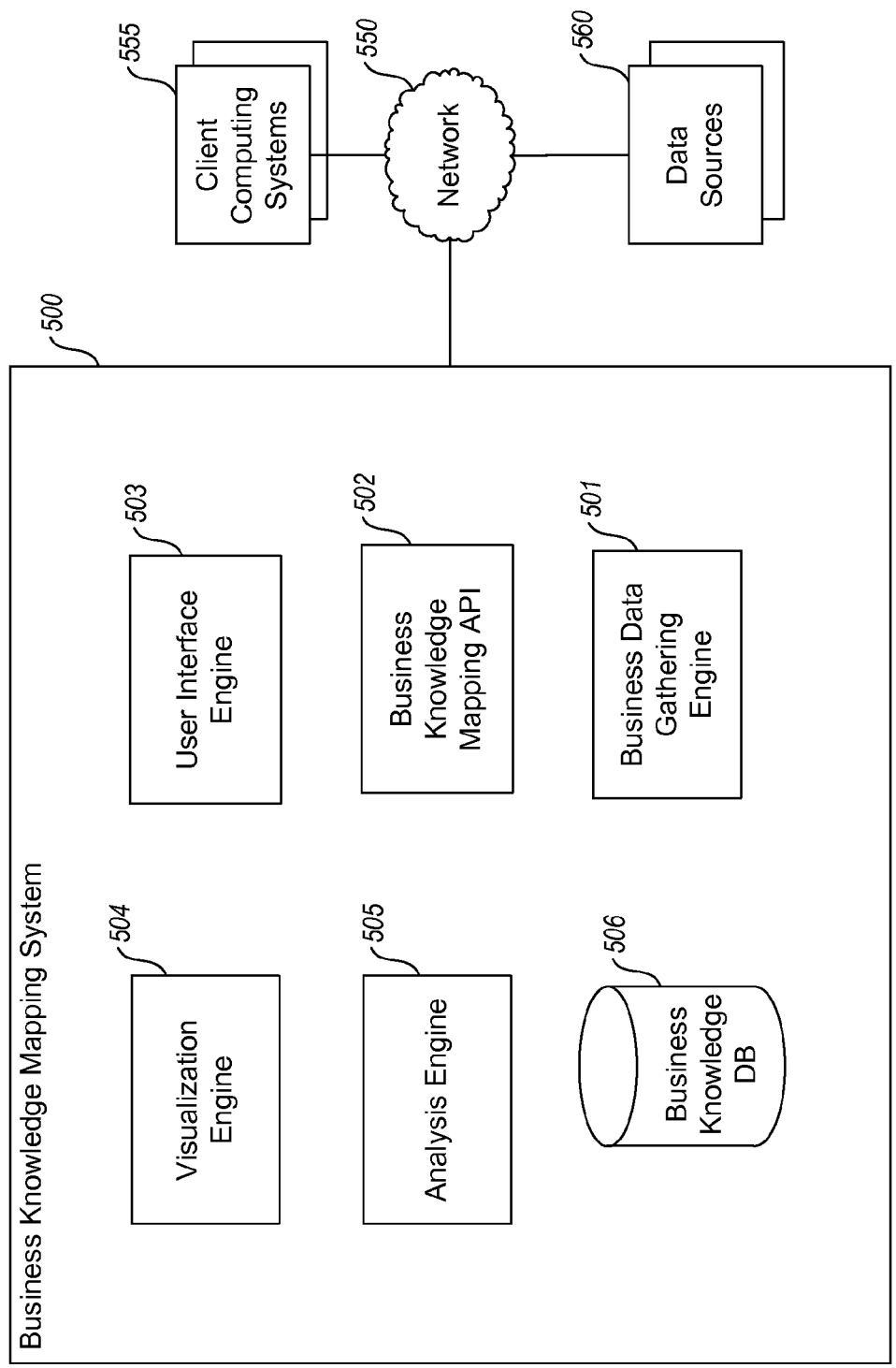
FIG. 5 is an example block diagram of the components of a Business Knowledge Mapping System configured to provide performance indicators in addition to other information about business entities.

FIG. 5 is an example block diagram of the components of a Business Knowledge Mapping System configured to provide performance indicators in addition to other information about business entities. The illustrated system may provide visual representations of relationships between multiple business entities that are augmented with indicators of performance of financial instruments associated with at least some of the multiple business entities. For example, the Business Knowledge Mapping System may provide a visual representation (e.g., a map, a graph, a network, etc.) illustrating relationships between entities involved in a proposed merger between two publicly traded companies. The provided visual representation may include indicators that reflect the performance of the stock price of each of the two companies. In some cases, multiple indicators for each company may be provided, such as for representing changes in stock price during time periods occurring before and after announcement of the proposed merger.

The Business Knowledge Mapping System 500 of FIG. 5 comprises a Business Data Gathering Engine 501, a Business Knowledge Mapping Application Program Interface ("API") 502, a User Interface Engine 503, a Visualization Engine 504, an Analysis Engine 505, and a Business Knowledge Database 506.

The Business Data Gathering Engine 501 obtains (e.g., harvests, gathers, downloads, receives) data from various data sources 560 via a network 550 for storage in the Business Knowledge Database 506. The data sources 560 may include various structured (e.g., Securities and Exchange Commission filings) and unstructured (e.g., news stories) sources of information about various business entities. The Business Data Gathering Engine 501 may additionally process (e.g., parse, mine, format, filter) the obtained data prior to, or after, storage in the Business Knowledge Database 506 in order to extract additional information for use by other components of the system 500.

The Business Knowledge Mapping API 502 may implement and provide an interface that may be programmatically invoked for purposes of controlling, managing, or otherwise interacting with the system 500. For example, third parties may design and implement customized client applications that utilize business knowledge mapping services provided by the system 500, such as to obtain data reflecting business knowledge and/or visual representations of such business knowledge.

The User Interface Engine 503 provides functionality related to user interaction with the system 500. In some embodiments, users operating client computing systems 555 may operate client applications (e.g., Web browsers, not shown) for interacting with the system 500 via the User Interface Engine 503 to search for, explore, query, browse, and/or interact with visual representations of business knowledge.

The Visualization Engine 504 provides functionality related to graphical representation of business knowledge, such as rendering, layout, and management of visual representations (e.g., graphs, networks, vectors, etc.) of business knowledge. Such visual representations may be stored or otherwise represented in various formats (e.g. XML formats), for ease of processing, caching, and storage in the Business Knowledge Database 506.

The Analysis Engine 505 provides analytic services related to obtaining and displaying business knowledge. In some cases, the Analysis Engine 505 may include multiple modular analytic engines (not shown) that are each configured to analyze, or otherwise process particular types of information that reflects business knowledge. For example, a first analytic engine may be configured to determine market performance indicators as described in more detail above, while a second analytic engine may be configured to identify educational relationships between persons and educational institutions, and a third analytic engine may be configured to identify ownership interests in corporations held by persons.

The various embodiments described above can be combined to provide further embodiments. All of the U.S. patents, U.S. patent application publications, U.S. patent applications, foreign patents, foreign patent applications and nonpatent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

From the foregoing it will be appreciated that, although specific embodiments of the invention have been described herein for purposes of illustration, various modifications may be made without deviating from the spirit and scope of the invention. For example, one skilled in the art will recognize that the methods and systems for providing information about financial markets discussed herein are applicable to other architectures and topologies other than the Internet. One skilled in the art will also recognize that the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A computer-implemented method for displaying information about financial market data, the method comprising:
   under control of a computing system,
   identifying a first attribute of performance of an instrument being traded on a financial market;
   determining a first time interval that includes a first time and a second time, wherein the first time interval covers at least one day;
   automatically generating a first directional indicator of performance of the instrument, the generated first directional indicator including a line having an origin that reflects a value of the first attribute of the performance of the instrument observed at the first time and a destination that reflects a value of the first attribute of the performance of the instrument observed at the second time, wherein the line of the generated first indicator has a horizontal component of nonzero length on a horizontal axis, wherein the line of the generated first indicator has a vertical component of nonzero length on a vertical axis, wherein the line of the generated first indicator is positioned at an angle to the horizontal axis, and wherein the angle increases as a function of a difference between the value of the first attribute of the performance of the instrument observed at the second time and the value of the first attribute of the performance of the instrument observed at the first time;
   determining a second time interval that includes a third time and a fourth time, wherein the second time interval covers at least one day;
   automatically generating a second indicator of performance of the instrument, the generated second indicator including a line having an origin that reflects a value of the first attribute of the performance of the instrument observed at the third time and a destination that reflects a value of the first attribute of the performance of the instrument observed at the fourth time, wherein the second indicator is positioned at an angle to a horizontal axis, and wherein the angle of each of the first and second indicators is greater than 0 and less than 90 degrees; and
   initiating display of the generated first and second directional indicators on a two-dimensional display medium, wherein the line of the first indicator and the line of the second indicator each have a thickness that reflects a value of a second attribute of performance of the instrument, wherein the thickness of the line of the first indicator varies from a first thickness at the origin of the line of the first indicator to a second thickness at the destination of the line of the first indicator, such that the first thickness reflects a value of the second attribute observed at the first time and the second thickness reflects a value of the second attribute observed at the second time.

2. The method of claim 1 wherein the generated first directional indicator includes a vector consisting of the line and an arrowhead.

3. The method of claim 1 wherein the instrument is a stock share or a bond.

4. The method of claim 1 wherein the first attribute of performance of the instrument is price of the instrument.

5. The method of claim 1 wherein the first attribute of performance of the instrument is at least one of volume of sale of the instrument, rate of change of price of the instrument, or variability of price of the instrument.

6. The method of claim 1 wherein the generated first directional indicator includes an identification of the instrument that is displayed in a position adjacent to the generated first directional indicator, such that the origin of the line is proximate to the identification of the instrument and the destination of the line is distal to the identification of the instrument.

7. The method of claim 1 wherein the thickness of the line of the second indicator is uniform.

8. The method of claim 1 wherein the line of the first or second indicator has a color that reflects a value of a third attribute of performance of the instrument.

9. The method of claim 1 wherein the line of the first or second indicator has a shade of gray that reflects a value of a third attribute of performance of the instrument.

10. The method of claim 1 wherein the line of the first or second indicator has a texture that is at least one of solid, dashed, or dotted, and wherein the texture reflects a value of a third attribute of performance of the instrument.

11. The method of claim 1 wherein the line of the first or second indicator has a characteristic that reflects a value of a third attribute that is at least one of price of the instrument, volume of sale of the instrument, rate of change of price of the instrument, or variability of price of the instrument.

12. A non-transitory computer-readable storage medium whose contents enable a computing system to display information about financial market data, by performing a method comprising:
   identifying a attribute of performance of a market aspect;
   determining a first time interval that includes a first time and a second time, wherein the first time interval covers at least one day;
   automatically generating a first indicator of performance of the market aspect, the generated first indicator including a line having an origin that reflects a value of the attribute of the performance of the market aspect observed at the first time and a destination that reflects a value of the attribute of the performance of the market aspect observed at the second time, wherein the line of the generated first indicator has a horizontal component of nonzero length on a horizontal axis, wherein the line of the generated first indicator has a vertical component of nonzero length on a vertical axis, wherein the line of the generated first indicator is positioned at an angle to the horizontal axis, and wherein the angle increases as a function of a difference between the value of the first attribute of the performance of the market aspect observed at the second time and the value of the first attribute of the performance of the market aspect observed at the first time;

determining a second time interval that includes a third time and a fourth time, wherein the second time interval covers at least one day;

automatically generating a second indicator of performance of the market aspect, the generated second indicator including a line having an origin that reflects a value of the first attribute of the performance of the market aspect observed at the third time and a destination that reflects a value of the first attribute of the performance of the market aspect observed at the fourth time, wherein the second indicator is positioned at an angle to a horizontal axis, and wherein the angle of each of the first and second indicators is greater than 0 and less than 90 degrees; and initiating display of the generated first and second indicators on a two-dimensional display medium, wherein the line of the first indicator and the line of the second indicator each have a thickness that reflects a value of a second attribute of performance of the market aspect, wherein the thickness of the line of the first indicator varies from a first thickness at the origin of the line of the first indicator to a second thickness at the destination of the line of the first indicator, such that the first thickness reflects a value of the second attribute observed at the first time and the second thickness reflects a value of the second attribute observed at the second time.

13. The non-transitory computer-readable storage medium of claim 12 wherein the computer-readable memory medium is a memory in the computing system, and wherein the contents are instructions that when executed cause the computing system to perform the method.

14. The non-transitory computer-readable storage medium of claim 12 wherein the market aspect is at least one of a stock share, a bond, a mutual fund share, a currency unit, a commodity item, a market index, or an exchange traded fund share.

15. The non-transitory computer-readable storage medium of claim 12 wherein the method further comprises:
receiving from a remote computing system a request to provide information about the market aspect, the request including an indication of the market aspect and/or an indication of the first time interval.

16. The non-transitory computer-readable storage medium of claim 12 wherein the identifying of the attribute of performance of the market aspect includes obtaining the attribute of performance from previously specified user preferences.

17. The non-transitory computer-readable storage medium of claim 12 wherein the origin of the second indicator is proximate to the origin of the first indicator.

18. The non-transitory computer-readable storage medium of claim 12 wherein the origin of the second indicator is proximate to the destination of the second indicator.

19. A computing device configured to display information about financial market data, comprising:
a processor;
a memory; and
a module stored on the memory that is configured, when executed by the processor, to:
provide a designation of a market aspect to a remote market performance indicator provider, the provider configured to:
determine a first time interval that includes a first time and a second time, wherein the first time interval covers at least one day;

automatically generate a first indicator of performance of the designated market aspect, the generated indicator including a line having an origin that reflects a value of an attribute of performance of the designated market aspect observed at the first time and a destination that reflects a value of the attribute of performance of the designated market aspect observed at the second time, wherein the line of the generated first indicator has a horizontal component of nonzero length on a horizontal axis, wherein the line of the generated first indicator has a vertical component of nonzero length on a vertical axis, wherein the line of the generated first indicator is positioned at an angle to the horizontal axis, and wherein the angle increases as a function of a difference between the value of the attribute of the performance of the designated market aspect observed at the second time and the value of the attribute of the performance of the designated market aspect observed at the first time;

determine a second time interval that includes a third time and a fourth time, wherein the second time interval covers at least one day; and automatically generate a second indicator of performance of the market aspect, the generated second indicator including a line having an origin that reflects a value of the first attribute of the performance of the market aspect observed at the third time and a destination that reflects a value of the first attribute of the performance of the market aspect observed at the fourth time, wherein the second indicator is positioned at an angle to a horizontal axis, and wherein the angle of each of the first and second indicators is greater than 0 and less than 90 degrees; receive from the remote market performance indicator provider a description of the generated first and second indicators of performance of the designated market aspect; and initiate display of the generated first and second indicators on a two-dimensional display medium, wherein the line of the first indicator and the line of the second indicator each have a thickness that reflects a value of a second attribute of performance of the market aspect, wherein the thickness of the line of the first indicator varies from a first thickness at the origin of the line of the first indicator to a second thickness at the destination of the line of the first indicator, such that the first thickness reflects a value of the second attribute observed at the first time and the second thickness reflects a value of the second attribute observed at the second time.

20. The computing device of claim 19 wherein the module includes software instructions for execution in the memory of the computing device.

21. The computing device of claim 19 wherein the designated market aspect includes at least one of one or more stock shares, one or more bonds, one or more mutual fund shares, one or more currency units, one or more commodity items, one or more a market indexes, and one or more exchange traded funds.

22. The computing device of claim 19 wherein the module is further configured to:
receive a representation of relationships between a first business entity associated with the designated market aspect and a second business entity; and
initiate display the generated indicator together with a graphical view of the relationships based on the received representation of relationships.

23. The computing device of claim 22 wherein the received representation of relationships is received from the remote market performance indicator provider.

24. The method of claim 1 wherein the angle of the first indicator increases as a linear or quadratic function of the difference between the value of the first attribute of the performance of the instrument observed at the second time and the value of the first attribute of the performance of the instrument observed at the first time.

25. The computer-readable storage medium of claim 15, wherein the angle of the first indicator is greater than the angle of the second indicator, thereby indicating that the difference between the value of the first attribute of the performance of the market aspect observed at the second time and the value of the first attribute of the performance of the market aspect observed at the first time is greater than a difference between the value of the first attribute of the performance of the market aspect observed at the fourth time and the value of the first attribute of the performance of the market aspect observed at the third time.

26. The method of claim 1 wherein the first and second time interval are different in size.

27. The method of claim 1 wherein the first and second time interval are at least partially overlapping.

28. The method of claim 1 wherein the first time interval is one week and the second time interval is one day.

29. The method of claim 1, further comprising:
generating multiple indicators of performance of the instrument, each of the multiple indicators reflecting performance of the instrument for a distinct day of a week; and displaying the generated multiple indicators in a sequence to reflect daily performance of the instrument over the course of the week.

* * * * *